P. M. LINCOLN.
SYSTEM OF ELECTRICAL DISTRIBUTION.
APPLICATION FILED JAN. 3, 1906.
1,039,767.
Patented Oct. 1, 1912.
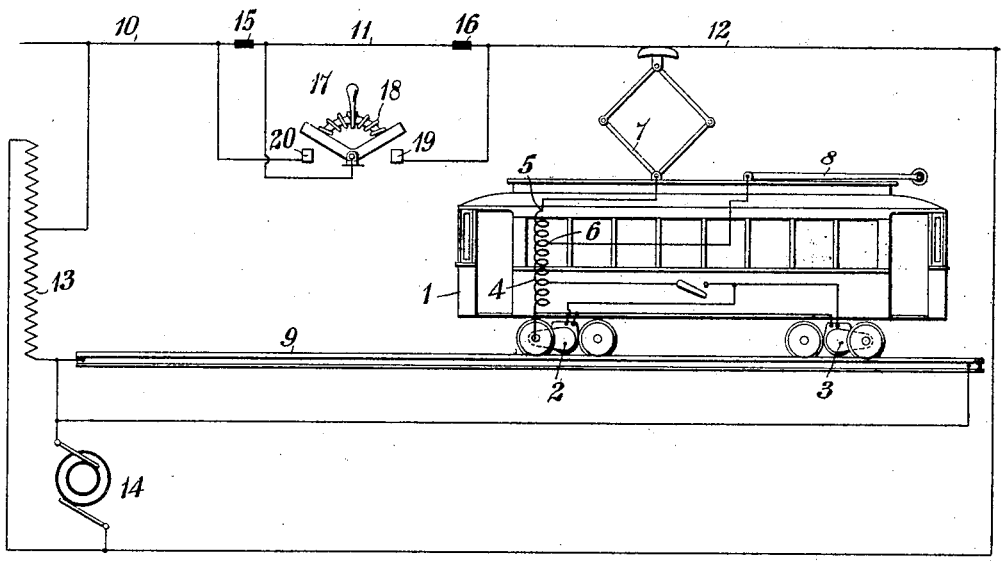
WITNESSES:
C. L. Belcher
Otto S. Schairer
INVENTOR
Paul M. Lincoln
BY
ATTORNEY

UNITED STATES PATENT OFFICE.

PAUL M. LINCOLN, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

1,039,767.   Specification of Letters Patent.   Patented Oct. 1, 1912.

Application filed January 3, 1906.   Serial No. 294,452.

*To all whom it may concern:*

Be it known that I, PAUL M. LINCOLN, a citizen of the United States, and a resident of Pittsburgh, in the county of Allegheny and State of Pennsylvania, have invented a new and useful Improvement in Systems of Electrical Distribution, of which the following is a specification.

My invention relates to systems of electrical distribution and particularly to systems for supplying energy to the propelling motors of railway vehicles.

The object of my invention is to provide a system that shall comprise two or more sections to which different voltages or currents that differ otherwise in character are supplied and that shall embody novel and improved means whereby the vehicle circuits may be disconnected from one circuit of the system and connected to another circuit.

One of the principal advantages incident to the use of alternating current motors for the propulsion of railway vehicles lies in the fact that alternating current may be transmitted over long distances at high voltages and can be readily transformed to lower voltages for local use on the vehicles, it being well understood that electrical energy is most economically transmitted at high voltages and most readily utilized at low voltages. In systems which traverse both urban and rural districts, the voltages that may be applied to the sections in the cities and towns are frequently limited by ordinances to less than that which it is most desirable to apply to the rural sections of the system. When operating upon the low voltage sections of the system, the common wheel type of trolley collector is usually employed, but it is generally desirable to employ a different form of collector when operating upon the high voltage sections, such, for example, as that shown and described in Patent No. 803,252, granted to Westinghouse Electric & Manufacturing Company as assignee of Norman W. Storer.

In passing from one section to another of systems like that just described, it is necessary to remove one of the trolley collectors from service and employ the other. In order to permit of such change without danger to the attendants, I provide, between the sections to which high and low voltages, respectively, are applied, a section that is insulated therefrom and that is normally dead or deënergized and that may be energized by connection to the one or the other of the adjacent live sections. In passing from one live section to another, the vehicles are stopped in the dead section for a sufficient period to permit the attendant to change the trolley collectors and the normally dead section is then energized by connecting it to the live section in advance of the vehicle, the intervening section again becoming deënergized upon passage of the vehicle therefrom.

The single figure of the accompanying drawing is a diagrammatic view of a system embodying my invention.

A vehicle 1 is provided with motors 2 and 3 and a lowering transformer 4 from which the motors 2 and 3 are adapted to be supplied, terminal 5 and an intermediate point 6 of the transformer being connected respectively to trolley collectors 7 and 8. The trolley collector 7 may be of the bow type or any other suitable form that is especially adapted for the collection of high voltage currents and the trolley collector 8 may be of the common wheel type. The vehicle operates upon track rails 9 and the trolley collectors 7 and 8 are adapted to engage one or another of trolley conductors 10, 11 and 12. The conductor 10 is here shown as supplied from a transformer 13 that is connected to a suitable source, such as that shown at 14, while the conductor 12 is connected directly to the source 14 in order that a higher voltage may be supplied thereto. The conductor 11 is located between the conductors 10 and 12 and is insulated therefrom by means of devices 15 and 16, such, for example, as that shown in Patent No. 803,215, granted to Westinghouse Electric & Manufacturing Company as assignee of Harry P. Davis and Theodore Varney, and is adapted to be connected to the one or the other of the conductors 10 and 12 by means of a switch 17 that is normally maintained in open position by means of centralizing springs 18. If it is desired to move the vehicle into the section of the system that is supplied from the conductor 10 when it is supplied from the conductor 12, it will first be moved into the dead section 11, by inertia or otherwise; the trolley collector 7 then may be lowered and the collector 8 raised into engagement with the conductor 11. After the collector 8 has been placed in engagement with conductor 11, the switch 17 may be moved into engagement with contact terminal 20 in order to impress the same voltage upon the conductor 11 as is applied to the conductor 10, whereupon the vehicle may be moved from the normally dead section of the system into the adjacent section that is supplied by the conductor 10.

While my invention has been shown and described as particularly applicable to systems in which different alternating current voltages are applied to the respective sections, it will be understood that it is equally applicable to systems in which the sections are supplied, respectively, with direct and alternating current, and that, instead of or in addition to changing the trolley collectors, any other well known and suitable means may be employed for insuring proper and satisfactory operation of the motors under the conditions imposed by the system.

I claim as my invention:

1. A system of distribution comprising a plurality of line sections, means for supplying energy of different character to the respective sections, normally deënergized intervening sections, and means for connecting the same to the one or the other of the adjacent sections.

2. A system of distribution comprising a plurality of line sections, means for supplying different voltages thereto, normally deënergized intervening sections, and means for connecting the intervening sections to the one or the other of the adjacent energized sections.

3. A system of distribution comprising a plurality of line sections, means for supplying energy of different character to the respective sections, normally deënergized intervening sections that are insulated from the main sections, and means for connecting the intervening sections to the one or the other of the adjacent energized sections.

4. The combination with a system of distribution comprising a plurality of normally energized line sections, means for supplying energy of different character to the respective sections, and normally deënergized intervening sections, of a vehicle supplied from the system, and means for connecting the intervening sections to the one or the other of the adjacent energized sections so as to enable the vehicle to pass from the intervening deënergized sections.

5. The combination with a system of distribution comprising line sections, means for supplying energy of different character to the respective sections, a normally deënergized intervening section, and means for connecting the normally deënergized section to the one or the other of the adjacent sections, of translating devices, collecting devices, and means between said collecting and translating devices for modifying the energy to suit the translating devices.

In testimony whereof, I have hereunto subscribed my name this 27th day of December, 1905.

PAUL M. LINCOLN.

Witnesses:
C. E. ATWOOD,
BIRNEY HINES.

Copies of this patent may be obtained for five cents each, by addressing the "Commissioner of Patents, Washington, D. C."